(12) United States Patent
Klipfel et al.

(10) Patent No.: US 9,670,833 B2
(45) Date of Patent: Jun. 6, 2017

(54) ACTUATOR AND EXHAUST GAS RECIRCULATION VALVE, WASTEGATE OR VARIABLE TURBINE GEOMETRY DEVICE OF A TURBOCHARGER COMPRISING AN ACTUATOR

(75) Inventors: Bernhard Klipfel, Karlsruhe (DE); Christoph Thiery, Mannheim (DE)

(73) Assignee: COOPER-STANDARD AUTOMOTIVE (DEUTSCHLAND) GMBH, Schelklingen (DE)

( * ) Notice: Subject to any disclaimer, the term of this patent is extended or adjusted under 35 U.S.C. 154(b) by 0 days.

(21) Appl. No.: 13/208,258

(22) Filed: Aug. 11, 2011

(65) Prior Publication Data

US 2012/0037825 A1 Feb. 16, 2012

(30) Foreign Application Priority Data

Aug. 12, 2010 (EP) .................................... 10172632

(51) Int. Cl.
*F16K 31/04* (2006.01)
*F02B 37/18* (2006.01)
*F02M 26/54* (2016.01)

(52) U.S. Cl.
CPC .......... *F02B 37/186* (2013.01); *F02M 26/54* (2016.02); *F16K 31/04* (2013.01); *F16K 31/047* (2013.01); *Y02T 10/144* (2013.01); *Y10T 74/18984* (2015.01); *Y10T 74/19721* (2015.01); *Y10T 74/19726* (2015.01)

(58) Field of Classification Search
CPC .......... F02M 25/0771; F02M 25/0773; F02M 25/0778; F16K 31/04; F16K 31/047; F16K 31/50; F15B 15/068; Y10T 74/18984; Y10T 74/19721; Y10T 74/19726; F02B 37/186
USPC .......... 251/229, 251–253, 262, 263, 129.11; 123/568.23, 568.24, 568.11, 188.1, 188.2, 123/188.17, 190.1; 74/424.76

See application file for complete search history.

(56) References Cited

U.S. PATENT DOCUMENTS

| | | | |
|---|---|---|---|
| 373,072 A | 11/1887 | Jarvis | |
| 858,771 A * | 7/1907 | Whitehouse | 251/252 |
| 929,606 A * | 7/1909 | Lavigne | 251/252 |
| 980,585 A * | 1/1911 | Barnes | 251/225 |
| 2,567,856 A | 9/1951 | Polk | |
| 2,646,100 A | 7/1953 | Gibson | |
| 3,101,622 A | 8/1963 | Johnson et al. | |
| 3,190,628 A | 6/1965 | Litzka | |
| 3,334,829 A | 8/1967 | Fisher et al. | |
| 3,881,398 A | 5/1975 | Gravagne | |

(Continued)

FOREIGN PATENT DOCUMENTS

| | | |
|---|---|---|
| DE | 46 204 | 4/1888 |
| DE | 2 211 955 | 9/1973 |

(Continued)

*Primary Examiner* — Mary McManmon
*Assistant Examiner* — Ian Paquette
(74) *Attorney, Agent, or Firm* — Knobbe, Martens, Olson & Bear, LLP

(57) ABSTRACT

An actuator comprising a drive, at least one rotatable threaded element and at least one output element driven in translation thereby is described, characterized in that the threaded element has at least two regions of differing pitch and a rotational axis of the threaded element is inclined relative to a translational axis of the output element.

15 Claims, 3 Drawing Sheets

(56) References Cited

U.S. PATENT DOCUMENTS

| | | |
|---|---|---|
| 4,089,505 A | 5/1978 | Anderle et al. |
| 4,251,050 A | 2/1981 | McInerney |
| 4,256,019 A | 3/1981 | Braddick |
| 4,403,538 A | 9/1983 | Rise |
| 4,796,430 A | 1/1989 | Malaker et al. |
| 4,834,033 A | 5/1989 | Larsen |
| 4,941,672 A | 7/1990 | Godin |
| 4,993,730 A | 2/1991 | Galtier et al. |
| 5,078,021 A | 1/1992 | Freywiss |
| 5,701,741 A | 12/1997 | Halsall |
| 6,007,047 A * | 12/1999 | Phipps .................... 251/252 |
| 6,039,034 A | 3/2000 | Field et al. |
| 6,224,034 B1 * | 5/2001 | Kato et al. ................ 251/164 |
| 6,435,169 B1 * | 8/2002 | Vogt ...................... 123/568.23 |
| 6,793,194 B1 | 9/2004 | Grinberg |
| 6,886,546 B1 | 5/2005 | Bircann et al. |
| 8,171,919 B2 * | 5/2012 | Klipfel et al. ........... 123/568.23 |
| 8,651,455 B2 | 2/2014 | Albert et al. |
| 2003/0015048 A1 | 1/2003 | Schmidt et al. |
| 2004/0069285 A1 | 4/2004 | Telep et al. |
| 2010/0176325 A1 * | 7/2010 | Klipfel et al. ............. 251/213 |
| 2012/0036950 A1 | 2/2012 | Klipfel et al. |

FOREIGN PATENT DOCUMENTS

| | | |
|---|---|---|
| DE | 10 2008 004 688 | 7/2009 |
| EP | 1111227 | 12/2000 |
| EP | 1526271 | 10/2003 |
| EP | 1 637 784 A1 | 3/2005 |
| EP | 1882843 | 2/2007 |
| EP | 2 169 268 A2 | 3/2010 |
| JP | 2006-274833 | 10/2006 |
| JP | 2007-262964 | 10/2007 |
| WO | WO 2005/021954 | 10/2005 |
| WO | WO 2006/096750 | 9/2006 |
| WO | WO 2009/010711 A1 | 1/2009 |
| WO | WO 2009/062928 | 5/2009 |
| WO | WO 2009/090131 A1 | 7/2009 |

* cited by examiner

ACTUATOR AND EXHAUST GAS RECIRCULATION VALVE, WASTEGATE OR VARIABLE TURBINE GEOMETRY DEVICE OF A TURBOCHARGER COMPRISING AN ACTUATOR

RELATED APPLICATIONS

This application claims the priority of European Patent Application No. EP 10 172 632.1, filed Aug. 12, 2010, the entirety of which is hereby incorporated by reference herein.

BACKGROUND OF THE INVENTION

Field of the Invention

The invention relates to an actuator and to an exhaust gas recirculation valve, a wastegate or a variable turbine geometry device of a turbocharger comprising an actuator of this kind.

In the field of internal combustion engines, it is known to recirculate exhaust gas to the fresh air side as a function of the operating state in order to reduce fuel consumption and pollutant emissions. The associated valve may be provided in this connection with a tappet displaceable in translation or with a flap actuated by means of a lever, while it may be advantageous for the actuator to have a rotary drive. This applies in the same manner to wastegates and/or variable turbine geometry devices of exhaust gas turbochargers, adjustable by means of a tappet displaceable in translation.

Description of the Related Art

An exhaust gas recirculation valve is known from EP 1 111 227 A2, in which the rotary motion of a drive is converted into a translational motion of the valve element. A rotary motion is imparted to the valve element at least at the start of the opening operation.

EP 1 526 271 A1 relates to an exhaust gas recirculation valve in which the rotary motion of a drive is converted into a reciprocating motion of the valve element, wherein the valve element may rotate with the drive element during the opening operation, but is not forcibly rotated therewith. The rotary motion is converted into a reciprocating motion essentially by means of a driven "screw" comprising a thread in engagement with a fixed, but rotatable wheel.

SUMMARY OF THE INVENTION

An object of the invention is to provide an improved actuator, particularly with respect to its operating characteristics.

This problem is solved by the actuator described in claim 1.

The latter comprises a drive, at least one rotatable threaded element and at least one output element driven in translation. The drive of the actuator is preferably designed as a rotary drive, but is not limited thereto. The rotatable threaded element may be, e.g. a screw comprising a thread or part of a thread or another threaded element. The screw could also be referred to as a "worm". The output element driven in translation is in engagement with the screw in such a manner that rotation of the screw leads to a translational motion of the output element. The output element may be, e.g. a portion projecting from the valve tappet, a wheel or roller projecting therefrom and in engagement with the screw, or an element comprising a mating thread.

According to the invention, the threaded element has at least two regions of differing pitch. In other words, the thread may be finer or coarser in some regions than in others. A fine pitch allows a greater opening force to be transmitted, accompanied by greater rotational travel. A comparatively large force of this kind can be used, e.g. at the start of the opening movement of a valve to apply a particularly high force, e.g. in order to release bonded joints. As soon as these are released, the force can be reduced, as a result of which the thread can be coarser in this region. It should be mentioned by way of example that, e.g. a force of between 400 N and 250 N to 300 N can be generated over the first millimeters of a valve stroke, while this force moves between 200 N and 300 N in the remaining region of the valve stroke. The finer region may correspond, e.g. to rotation of 40° to 70°. The transition to a coarser region furthermore does not necessarily have to be in the form of a bend, but may be in the form of a gentle curve, e.g. extending over an angle of 90° to 100°. In other words, a region is provided in which the pitch increases continuously from that of a fine region to that of a coarser region or decreases in the opposite direction. The entire range of rotation of the threaded element may be, e.g. 300° to 500° or more.

A rotational axis of the threaded element is inclined relative to a translational axis of the output element. In geometric terms, the two axes are skewed relative to one another. This essentially means that forces are transmitted between the threaded element and the output element in a direction that is not inclined relative to the contact surface of the threaded element, or at least not to such a great extent as hitherto. If the rotational axis of the threaded element and the translational axis of the output element are parallel to one another, forces are conventionally transmitted from the screw to the output element via a surface inclined relative to the translational axis of the output element. This means that a rectilinear force applied by the output element, e.g. as a result of the gas pressure, may lead to rotation of the threaded element, thereby resulting in unintentional displacement of a valve element. In the actuator according to the invention, inclination of this kind between the translational axis of the output element and the rotational axis of the threaded element is reduced so that higher forces are required for the rotation of the threaded element. In practice, this can substantially prevent a valve from being displaced unintentionally by gas forces.

Preferred developments are described in the further claims.

As mentioned, the basic concept according to the invention can be used in a particularly advantageous manner if the thread has a finer pitch at the start than in other regions. The start of the thread may advantageously correspond to the start of an opening operation, so that a particularly high force can be generated here.

In particular, the threaded element preferably has a surface with which at least one portion of the output element, e.g. the aforementioned projection or the small wheel described, is in contact, and which surface is substantially perpendicular to the translational axis of the output element, at least at the start of the thread. By virtue of this arrangement, any force applied by the output element acts on the threaded element in a direction substantially perpendicular to the surface and consequently cannot cause any unintentional rotation thereof. This therefore advantageously ensures that there is no unintentional opening of an exhaust gas recirculation valve even in the event of corresponding exhaust gas back pressure, particularly when combined with the fact that the thread is comparatively fine at its start.

The actuator according to the invention is furthermore preferably combined with a valve element movable only in translation and not rotatable. Response delays and obstructions to the opening movement can thus be reduced in an advantageous manner.

It is furthermore preferred that a point at which a portion of the output element is in contact with the threaded element is aligned at least substantially with an axis of a valve element moved in translation. No transverse or lateral forces are thus applied to the output element and its guide in the arrangement consisting of the valve element moved in translation and the output element operatively connected thereto. This offers advantages from the point of view of continuous operation of the valve. It should be mentioned in connection with the measure described hereinbefore that it still displays its advantages even without the inclination of the rotational axis relative to the translational axis described hereinabove and that it should consequently be regarded as subject matter of the application irrespective of this. However, the orientation of a contact point on the threaded element relative to the translational axis of the valve element described can advantageously be combined with the feature described hereinabove and with all of the features specified hereinafter.

It is furthermore preferred that the valve element opens in a direction extending against the exhaust gas pressure. The exhaust gas back pressure can thus advantageously be used to assist with the closure of the valve and therefore to minimize the amount of leakage in the closed state.

Single-stage gearing is preferably provided between the drive and the threaded element. Single-reduction gearing of this kind improves the response characteristics of the valve, in particular as a result of reduced friction and lower mass inertia. Alternatively, the gearing may also be two-stage or multi-stage gearing, thereby allowing for the generation of higher forces.

The threaded element is preferably furthermore connected at least indirectly to a spring element, e.g. a spiral spring, which is only rotated. A spring element of this kind advantageously acts as a "failsafe" device ensuring that the valve closes even in the event of malfunction of or interruption to the electrical system.

It has furthermore proven to be advantageous for a valve housing in which the valve element is arranged to be designed in one piece, e.g. as a cast housing. The number of parts used can thus advantageously be reduced.

Finally, the valve housing is preferably provided with at least one cooling duct. The valve housing can thus be cooled, in particular in the vicinity of a valve tappet, as a result of which it is possible to improve the durability of the valve tappet and the tappet seal and guide and therefore of the exhaust gas recirculation valve as a whole.

In addition to an exhaust gas recirculation valve, the combination of at least one actuator according to the invention with a wastegate and/or a variable turbine geometry device of a turbocharger is also disclosed. Reference should be made in this connection with respect to the combination both with an exhaust gas recirculation valve and with the said components of a turbocharger to EP 2 172 682 A1, the disclosure of which with respect to details of the actuator, the exhaust gas recirculation valve and/or the threaded element referred to there as a threaded element is hereby incorporated by reference into the subject matter of this application. This publication is related to U.S. Publication No. 2010/0176325 (application Ser. No. 12/574,575), the entirety of which is also incorporated by reference herein and portions of which are included herein in connection with the description of FIGS. 3 and 4. With respect to a wastegate and/or a variable turbine geometry device of a turbocharger, this applies in particular to the application entitled "ACTUATOR FOR A WASTEGATE OR A VARIABLE TURBINE GEOMETRY DEVICE AND METHOD OF ACTUATION" U.S. application Ser. No. 13/208,266) filed in the name of the Applicant on the same date as the present application, the entirety of which is hereby incorporated by reference herein. In other words, all of the details disclosed therein relating to a wastegate, a variable turbine geometry device and/or the actuator disclosed therein can be used in the actuator according to this application, even when used with a valve, in particular an exhaust gas recirculation valve.

BRIEF DESCRIPTION OF THE DRAWINGS

The invention will now be described in more detail by way of an embodiment illustrated by way of example in the accompanying drawings, in which.

DETAILED DESCRIPTION OF THE PREFERRED EMBODIMENTS

Figure 1:
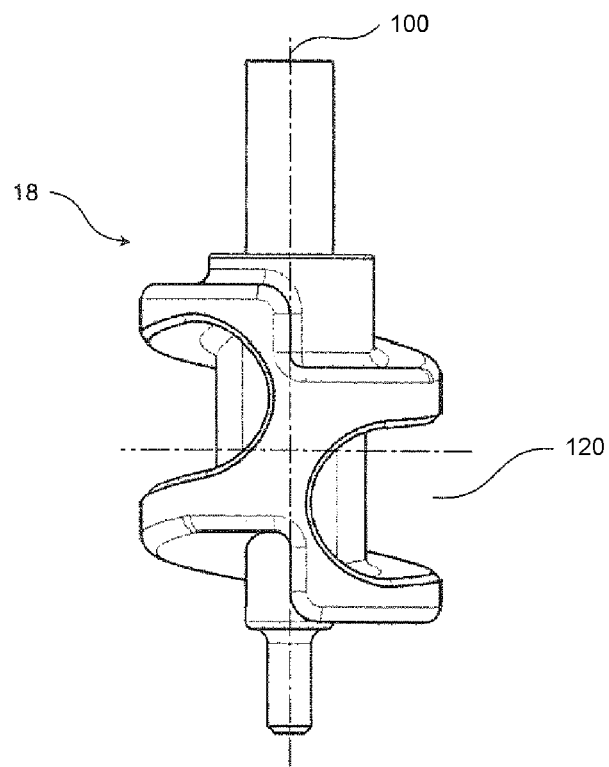
FIG. 1 is a side view of the threaded element of an actuator according to the invention.

FIG. 1 is a side view showing the threaded element 18 of an actuator according to the invention rotatable about an axis 100. In the case shown, the threaded element 18 has an almost complete (that is, almost 360 degree) thread 120 in which, e.g. a roller is situated in the mounted state, the roller being provided at the upper end of a valve tappet. If the valve tappet is guided axially and in this respect cannot rotate about the axis 100, while the threaded element 18 rotates about the axis 100, a rotary motion of the threaded element 18 is converted into a translational (reciprocating) motion of a tappet.

Figure 2:
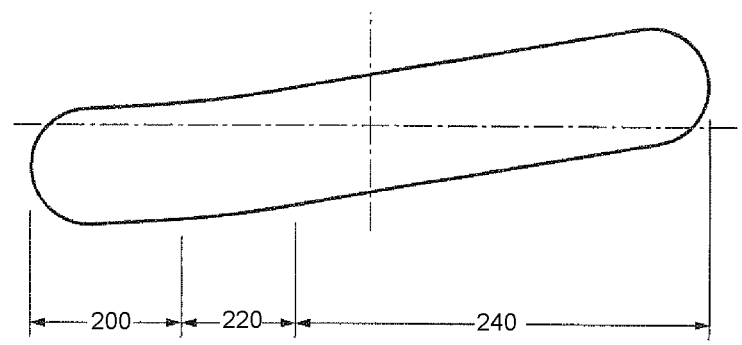
FIG. 2 is a developed view of the thread of the threaded element shown in FIG. 1.

FIG. 2 shows how the pitch of the thread of the threaded element 18 differs in some regions. At the start (region 200), it is comparatively fine so that a particularly large force can be generated here, e.g. at the start of an opening movement. This is followed by a region 220 with a continuously increasing pitch, which leads to a region 240 which is in general coarser than the region 200. Although this means that less force can be transmitted, the reciprocating motion takes place more rapidly in this region. It should be mentioned that the threaded element 18 may also have more or less than the almost complete thread shown in FIG. 1. The dimensions of the regions 200 to 240 may furthermore vary from those shown in FIG. 2.

Figure 3:
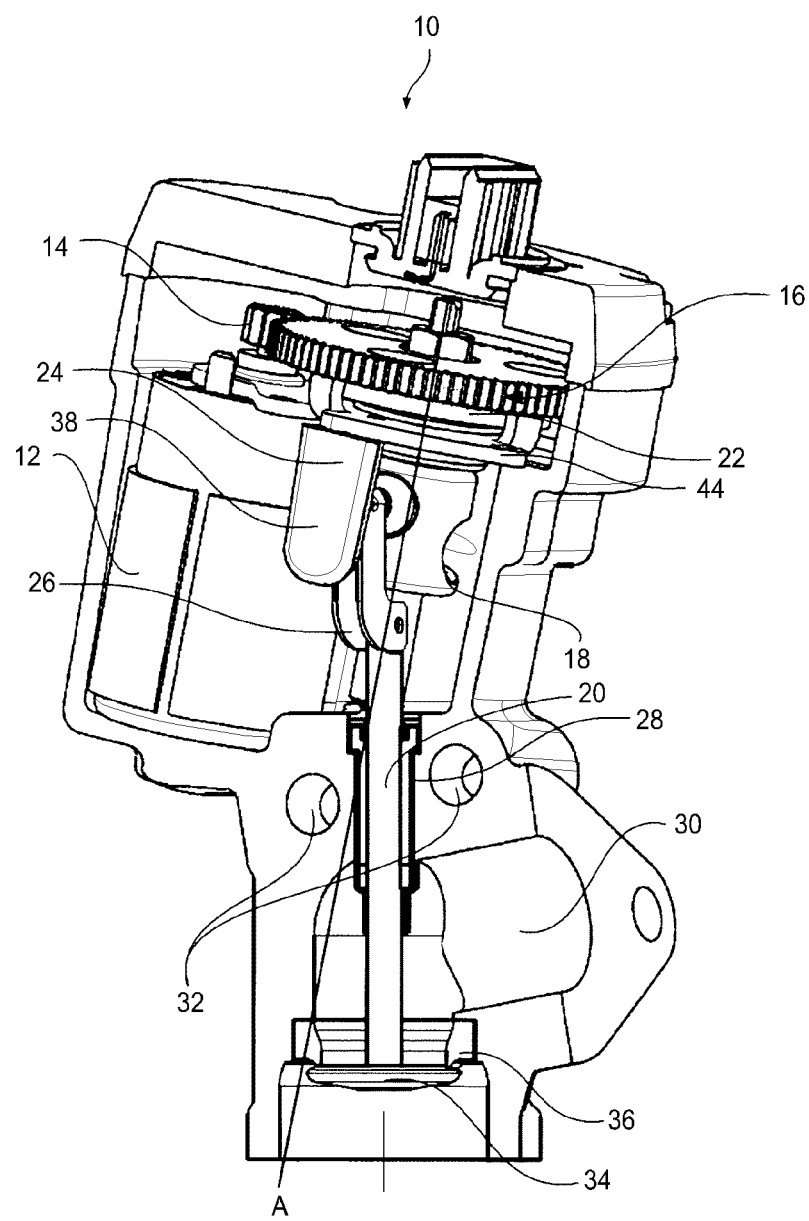
FIG. 3 shows a side view of the exhaust gas recirculation valve according to the invention.

As can be seen from FIG. 3, the exhaust gas recirculation valve 10 according to the invention comprises a drive 12 in the form of an inclined motor. In the illustrated embodiment, a pinion 14 is arranged on the motor shaft and drives a gear 16. The drive element 18 in the form of a worm gear (or worm) is attached to the gear 16 and drives the valve tappet 20 as described in more detail below. In the illustrated embodiment, as can be seen in more detail from FIG. 4, the worm comprises an axis A that is supported both at its upper end and at its lower end. In the illustrated embodiment, the arrangement of gear 16 and worm 18 is connected to a coil spring 22 which is solely twisted upon opening and closing of the valve. In the illustrated embodiment, the combination of pinion 14 and gear 16 corresponds to a single-stage transmission having the above-described advantages.

The conversion of the rotary motion of the worm 18 into a translational motion of the valve tappet 20 is effected by means of the driven element 24 which, in the illustrated embodiment, is configured as a small wheel and is in engagement with the thread of the worm 18. The small wheel 24 is rotatably attached to a bracket 26 fixed to the valve tappet 20. The valve tappet 20 is supported in a suitable bushing 28 which, in the illustrated embodiment, is provided in a valve housing 30 configured as a one-piece cast part. Moreover, as can be seen from FIG. 4, the valve housing 30 may be configured so as to additionally receive the drive 12 and the arrangement of drive element 18 and driven element 24. Only the transmission in the form of the pinion 14, the gear 16 and the coil spring 22 are located in the area of a lid 40. This lid may further comprise a connector (socket) 42 for electric terminals. For example, a connection to a controller connected to an engine control unit may be performed by means of this socket in order to electronically control the operation of the valve. With the coolant parts 32 one may discern that the valve housing 30 may advantageously be cooled in order to cool the valve tappet 20 and its bearing and seal, too.

A valve head (plate) 34 engaging a valve seat 36, which advantageously is provided with rather sharp edges is attached to the valve tappet 20. Advantageously, the valve element in the form of the valve head 34 is always, that is both in the open and the closed state, situated within the valve housing 30. In the illustrated embodiment, the opening of the valve head 36 is effected against the exhaust gas pressure, that is, it opens downward according to the orientation of FIG. 3, so that the valve head 36 assists in closing the valve in response to exhaust gas pressure. At the same time, there is no danger that the exhaust gas pressure inadvertently displaces the valve, due to the following reasons.

As can be seen from FIG. 3, the rotational axis A of the worm 18 serving as drive element is inclined with respect to the translational axis of the driven element 24, in other words, with respect to the axis of the valve tappet 20. Thus, in the illustrated embodiment, the surface in the region of the thread of the worm 18 engaging the small wheel 24 may be disposed largely perpendicular to the axis of the valve tappet 20. Thus, if a force acts upon the valve tappet 20, for example due to the exhaust gas pressure, this force will largely act perpendicular to the surface in the area of the thread of the worm 18, and consequently cannot twist it. Thus, an inadvertent displacement of the valve may advantageously be avoided, a circumstance particularly relevant for small openings.

Figure 4:
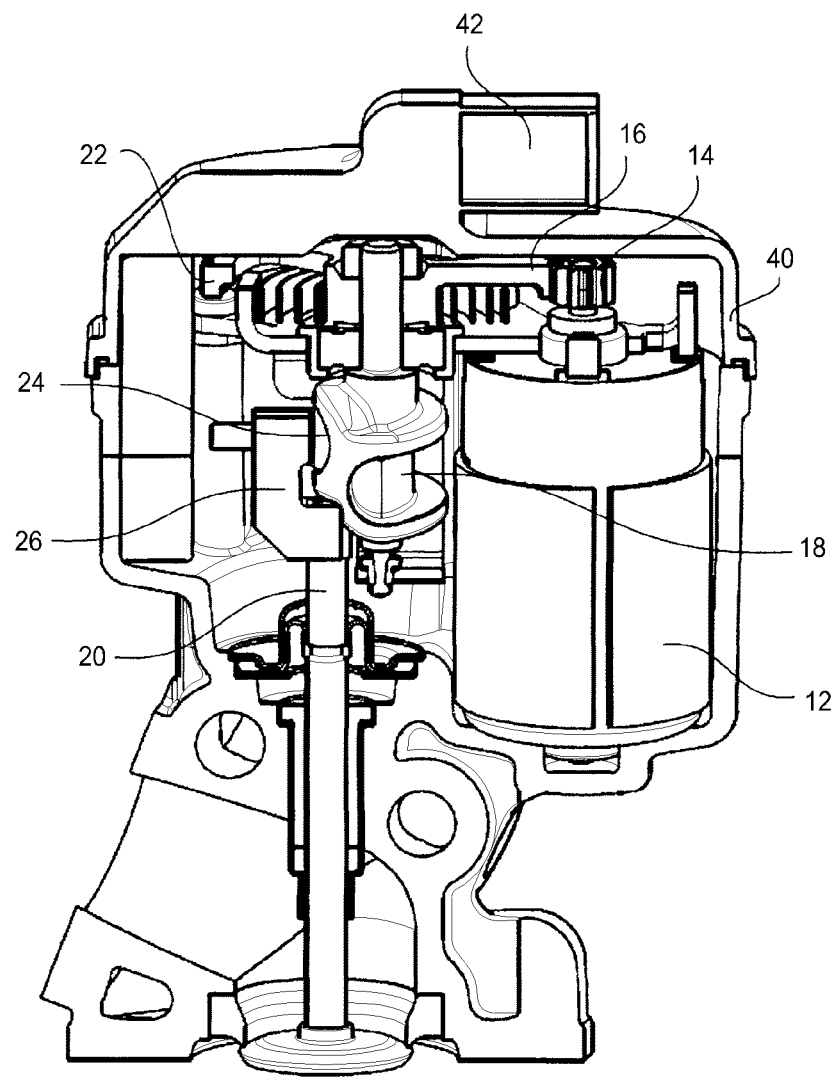
FIG. 4 shows a partially cut-away view of the exhaust gas recirculation valve according to the invention.

The preferred embodiment illustrated in the figures provides a further advantage, which will be explained by means of FIG. 4. To begin with, in FIG. 4 the gear 16 and the coil spring 22 are shown in section for better understanding. From FIG. 4 one may further take that the worm 18 comprises a nearly complete turn of a thread. Further, from the illustration of FIG. 4 one may take the additional advantage that the location at which the small wheel 24 engages the thread of the worm 18 is largely aligned with the axis of the valve tappet 20. In this way, no transverse or lateral forces are generated, offering advantages for the durability of the valve. As mentioned, this arrangement is achieved by means of the largely U-shaped bracket attached at the upper end of the valve tappet 20 and rotatably supporting the small wheel 24 at its other end.

As can additionally be taken from FIG. 3, a stationary guide 38 may be provided, which comprises a protrusion (not discernable in FIG. 1) extending into a slit of the bracket 26, for example, so that the bracket 26, which translates together with the valve tappet 20 upon actuating the valve, is guided in the direction of motion. FIG. 3 also shows that the guide 38 may be arranged on a plate 44 to which the drive 12 may additionally be attached and/or in which the axis of the worm 18 may be supported.

What is claimed is:

1. An actuator for an exhaust gas recirculation valve, wastegate or variable turbine geometry device of a turbocharger, comprising:
   a drive;
   at least one rotatable threaded element;
   at least one output element that can be driven in translation thereby, wherein the threaded element has at least two regions of differing pitch and a rotational axis of the threaded element is inclined relative to a translational axis of the output element;
   wherein the two regions of differing pitch comprise a finer pitch region and a coarser pitch region, wherein the finer pitch region extends between a starting position at a first end of a thread of the threaded element and an ending position of between 40 degrees and 70 degrees; and
   a transition region defined by a transition pitch that extends between the finer pitch region and the coarser pitch region, wherein the transition pitch increases continuously from the finer pitch region to the coarser pitch region.

2. The actuator according to claim 1, wherein the transition region extends over a rotation of 90 to 100 degrees starting from the ending position of the finer pitch region.

3. The actuator according to claim 1 in combination with a wastegate or a variable turbine geometry device of a turbocharger.

4. An actuator for an exhaust gas recirculation valve, wastegate or variable turbine geometry device of a turbocharger, comprising:
   a drive;
   at least one rotatable threaded element;
   at least one output element that can be driven in translation thereby, wherein the threaded element has at least two regions of differing pitch and a rotational axis of the threaded element is inclined relative to a translational axis of the output element;
   wherein the two regions of differing pitch comprise a finer pitch region and a coarser pitch region, wherein the coarser pitch region is located at a rotation that begins at between 130 to 170 degrees and extends to at least 300 degrees relative to a starting position at a first end of a thread of the threaded element, wherein the finer pitch region extends between a starting position at a first end of a thread of the threaded element and an ending position of between 40 and 70 degrees; and
   a transition region defined by a transition pitch that extends between the finer pitch region and the coarser pitch region, wherein the transition pitch increases continuously from the finer pitch region to the coarser pitch region.

5. The actuator according to claim 4, wherein the thread has a finer pitch at the start than in other regions.

6. The actuator according to claim 4, wherein the threaded element has a surface with which at least one portion of the output element is in contact and which is substantially perpendicular to the translational axis of the output element at least at the start of the thread.

7. The actuator according to claim 4 in combination with a wastegate or a variable turbine geometry device of a turbocharger.

8. The actuator according to claim 4, wherein the transition region extends over a rotation of 90 to 100 degrees starting from the ending position of the finer pitch region.

9. The actuator according to claim 4, further comprising an integral valve housing.

10. The actuator according to claim 9, wherein the valve housing has at least one cooling duct.

11. The actuator according to claim 4 in combination with a valve element moved only in translation and not rotated.

12. The actuator according to claim 11, wherein a point at which at least one portion of the output element is in contact with the threaded element is aligned at least substantially with a translational axis of the valve element moved in translation.

13. The actuator according to claim 12, wherein the threaded element is connected to a spring element only rotated upon actuation of the valve.

14. The actuator according to claim 12, wherein the valve element opens in a direction extending against the exhaust gas pressure.

15. The actuator according to claim 14, wherein it has single-reduction gearing.

\* \* \* \* \*